Aug. 13, 1968     D. SOURIAU     3,396,579
MASS FLOWMETER
Filed May 31, 1966     5 Sheets-Sheet 1

INVENTOR
DANIEL SOURIAU
BY
Bacon & Thomas
ATTORNEYS

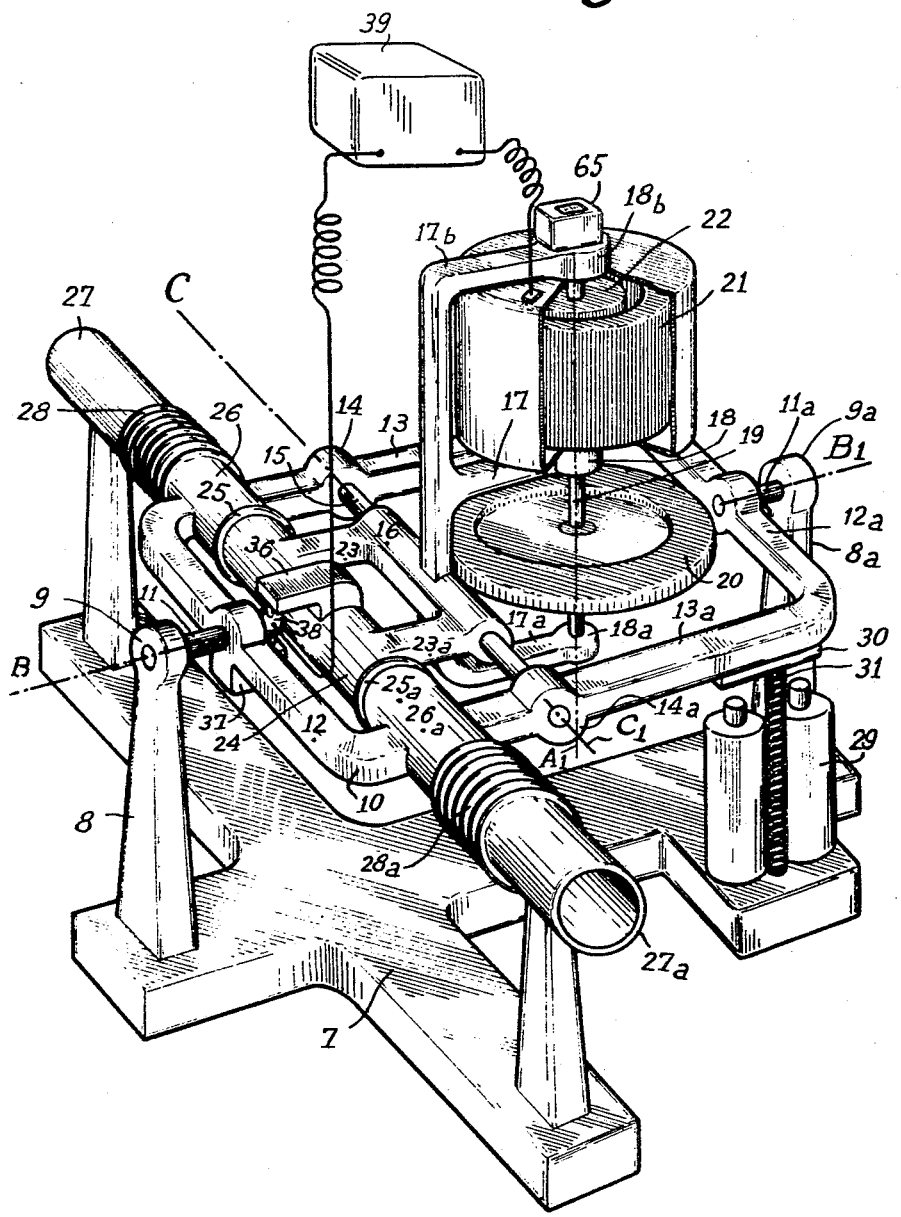

Aug. 13, 1968   D. SOURIAU   3,396,579
MASS FLOWMETER
Filed May 31, 1966   5 Sheets-Sheet 3
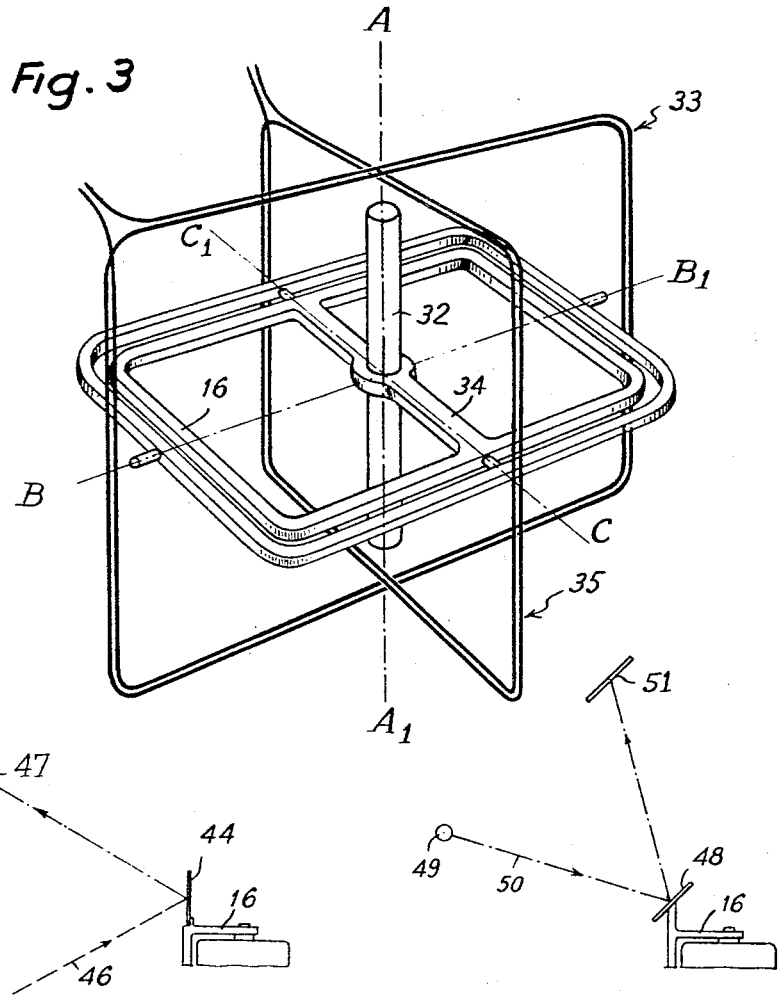
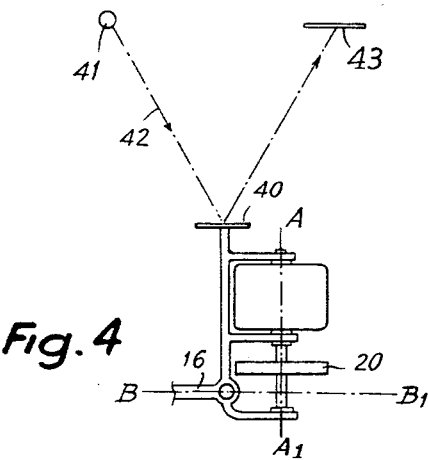
INVENTOR
DANIEL SOURIAU
BY
Bacon & Thomas
ATTORNEYS

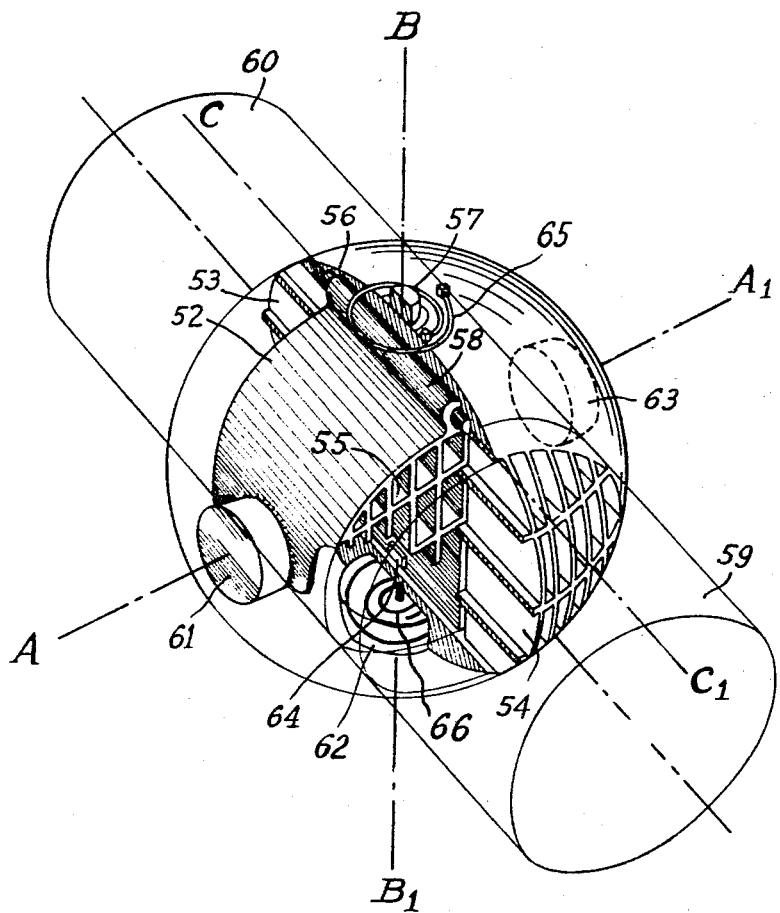

2,396,579
Patented Aug. 13, 1968

3,396,579
MASS FLOWMETER
Daniel Souriau, 53 Rue Ponchet,
Paris, France
Filed May 31, 1966, Ser. No. 554,171
Claims priority, application France, May 28, 1965,
18,672
5 Claims. (Cl. 73—194)

ABSTRACT OF THE DISCLOSURE

A device for measuring the mass flow of a fluid. The fluid is passed through a straight conduit segment, supported by a framework and oscillated about an axis perpendicular to the line of fluid flow. The fluid exerts a force on the walls of the segment, proportional to the product of mass flow of the fluid and instantaneous velocity of the segment, which may be represented as an alternating couple of forces acting perpendicular to the line of fluid flow and perpendicular to the axis of rotation of the segment. The magnitude of the couple of forces is measured by a gyroscope mounted upon the framework so that its precess axis will exert an opposing couple upon the framework. The speed of the gyro rotor is varied until the resultant couple of forces upon the framework is reduced to zero, after which the number of revolutions of the rotor may be counted over a predetermined time as a proportional representation of mass flow of the fluid.

---

The object of the invention is to provide a meter for measuring the mass of fluid outflow.

In the fluid mass meter according to the invention, a segment of an almost straight-line conduit conducting the fluid to be measured is activated around an axis perpendicular to its symmetric axis. The fluid has an oscillating movement of small range in accordance with a sinusoidal law as a function of time.

When the fluid passes through this conduit segment, it exerts on it a Coriolis force which is perpendicular both to the axis of the segment and to the axis of rotation of the segment and constantly proportional to the product of mass-outflow of the fluid and the instantaneous speed of rotation of the segment around its axis of rotation. The conduit segment 1 (FIGURE 1) is jointed at a fixed point 2 to a heavy support 3 by a rod 4 of a certain length and whose axis is coincident with the rotation axis $B—B_1$ of the conduit segment 1. The Coriolis force $F_1$ may be one of the two elements of an alternating couple having an axis $C—C_1$, perpendicular to the axis $B—B_1$, the other element being the reaction force $F_2$, which is equal to $F_1$ and in the opposite direction and is provided by the heavy support 3. This alternating couple varies according to a sinusoidal law if the mass fluid outflow in the conduit segment is constant.

The absolute measurement of the alternating couple is avoided by mounting in opposite thereto a solid compensating gyroscope 5. This gyroscope is placed at a certain distance from the fixed point 2, the axis of the gyroscope 5 being parallel to the axis $A—A_1$ passing through the fixed point 2, and perpendicular to the axes $B—B_1$ and $C—C_1$. The direction of movement of the visible parts of the gyroscope 5 following the arrow $V_2$ is in the reverse direction of movement $V_3$ of the fluid for an observer standing at the intersection of the axes $C—C_1$ and $A—A_1$. This gyroscope 5 is mounted on a frame 6 which forms with the rod 4 an oscillating framework common to the conduit segment 1 and the gyroscope 5. When the mass flow of the matter constituting the solid gyroscope passing through a radial half-plane containing the axis of the gyroscope 5 and fixed with respect to the common framework, multiplied by a negative numerical coefficient whose absolute value depends solely on the construction of the apparatus 1 is less than the mass flow of the fluid there is produced on the common framework a couple (having a conventional negative sign) in phase with the speed of rotation around the axis $B—B_1$ exerted on the framework. When the mass flow of the matter constituting the solid gyroscope, multiplied by the same coefficient is greater than the mass flow of the fluid, there is produced on the common framework a couple in phase with the speed of rotation around the axis $B—B_1$ exerted on the framework and having a conventional positive sign.

It may be said likewise that the phase of the alternating couple of response of the common framework with respect to the alternating movement around the axis $B—B_1$ lags by $\pi$ at the moment when the rotation speed of the solid gyroscope 5 (initially insufficient to produce equilibrium) becomes excessive.

By a control device sensitive to the phase, one can regulate the speed of rotation of the gyroscope so that the common framework will not produce any couple when it is forced to revolve around the axis $B—B_1$. The mass flow of the matter of the gyroscope passing through a plane joined to the common framework and containing the axis $A—A_1$ is then proportional to the mass flow of the fluid passing through the segment 1.

It suffices to count the revolutions of the solid gyroscope and to integrate, with respect to time, the mass flow of the fluid to know the mass of fluid flowing over a predetermined time, after adjusting the value by an additive numerical constant.

However, if the conduit segment 1, approximately straightlined, is connected to the inlet and outlet conduits of the fluid by flexible tubes, there is produced in such tubes an auxiliary Coriolis force which disturbs the measuring.

In order to eliminate such flexible tubes, the straightlined segment is simply placed into a conduit larger than itself which is joined rigidly to the inlet and outlet conduits and by some other device, such as a flexible diaphragm surrounding the straight segment at its point of oscillation, the fluid flowing from the inlet conduit is forced to pass through the straight segment and then to enter the outlet conduit. The fluid coming out of the inlet conduit following a direction tied to the fixed axes and entering the straight segment following a direction tied to the latter, undergoes a change of direction and a change in speed. A force of a hydrodynamic nature is thus exerted on the straight segment which is of the same order of magnitude as the Coriolis force mentioned above and which prevents any measuring.

This may be remedied by using a segment of straight conduit joined to the inlet and outlet conduits by flexible tubes. On the other hand, one no longer measures the Coriolis force on the straight segment as a whole, but only on its median portion, rendered mechanically independent of its two extremities. The only movement allowed the central segment is a movement of translation with respect to the end segments, in the direction of the Coriolis force, that is, according to the axis $A—A_1$. In this arrangement, the compensating gyroscope is only fixed to the central segment.

Finally, everything works as though the gyroscope and the cenrtal segment were mounted in the manner of a Cardan joint. They are articulated around the axis $C—C_1$ with a mobile framework bearing the end segments of the conduit section used in measuring. This mobile framework is articulated to the fixed support around the axis $B—B_1$.

Lastly, other forms of construction of the meter enable this measuring device to be adapted to large flows requiring large gauge pipes.

According to the present invention, a framework mounted to oscillate around the axis of a fixed support (and whose oscillation is maintained by a motor part) holds the almost rectilinear conduit section. The mean axis of the framework which is perpendicular to the axis of oscillation intersects the latter axis. The conduit section is divided into at least three segments each mechanically independent of its neighboring segment, that is two auxiliary end segments fixed to the oscillating framework and a central measuring segment. The central segment is part of a gyroscopic framework movably mounted on the oscillating framework about an axis parallel to the axis of the conduit element. The gyroscopic framework likewise carries a gyroscope whose axis of rotation is perpendicular to the geometric axis of the conduit element and to the latter's axis of oscillation. A means for detecting the couples transmitted by the axis of oscillation to the support oscillating around the mobile axis of the gyroscopic framework and relatively distant from it, is used, together with a control means for regulating the speed of rotation of the gyroscope. This enables reduction of the couple transmitted to the oscillating mass framework by adjusting the speed of rotation of the gyroscope to match flow of the fluid passing through the conduit element. The gyroscope is connected to a revolution-counter constituting a means of measuring the mass delivery integrated in relation to time.

Other advantageous aspects of the invention will become apparent from the following description of a form of construction given solely by way of example but not of limitation. The description is made with reference to the accompanying drawings in which:

FIGURE 2 is a view of a form of construction of a mass flow meter provided with a rectilinear conduit segment for a small mass flow of fluid;

FIGURE 3 is a view of the means for controlling the oscillations of the oscillating framework and for detecting the oscillations of the gyroscopic framework, comprising a magnetized bar;

FIGURE 4 is a view of means for detecting oscillations of the gyroscopic framework using light beams;

FIGURE 5 is a view of the same detecting means shown in FIGURE 4 with a mirror rotated 90 degrees;

FIGURE 6 is a view of the same detecting means shown in FIGURE 4 with a mirror rotated 45 degrees;

FIGURE 8 is a perspective view of another form of construction of a meter for measuring large flows of fluid.

Figure 1:
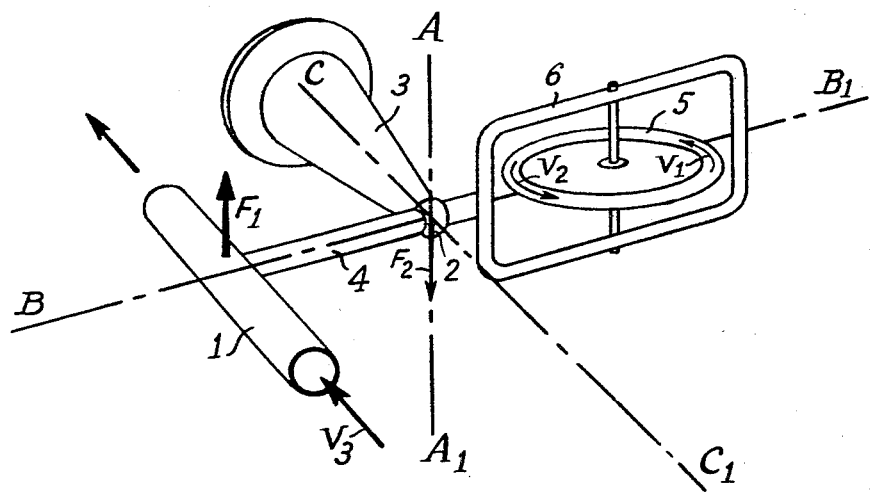
FIGURE 1 is a view of a conduit element for measuring, mounted on a support together with a solid gyroscope.

The embodiment of a mass meter for small flows of fluid, shown in FIGURE 2, consists of a fixed support 7 comprising support legs 8, 8a placed symmetrically opposite each other and having in their upper portion, coaxial bearings 9, 9a.

An oscillating framework 10 is pivotally mounted on shafts 11, 11a, fixed between two opposite sides 12, 12a of the framework 10. The shafts 11, 11a mounted in the bearings 9, 9a are coincidental with the rotation axis B—$B_1$ of the oscillating framework 10. On the other two opposite sides 13, 13a of the oscillating framework 10 are provided bearings 14, 14a, which are coaxial, and symmetrical in relation to axis B—$B_1$. In bearings 14, 14a, is pivotally mounted a shaft 15 which coincides with axis C—$C_1$ and bears a gyroscopic framework 16.

This gyroscopic framework 16, movable with respect to the oscillating framework 10, is provided with arms 17, 17a, 17b, having coaxial bearings 18, 18a, 18b about the axis A—$A_1$. Mounted within these bearings 18, 18a, 18b is a rotating shaft 19 of a gyroscope 20 located between arms 17, 17a.

Shaft 19 is moved by an electric motor 21, for example of the synchronous type, whose rotor 22 is keyed to an extension of the shaft 19.

In FIGURE 2, there is shown for further clarification, a motor which is independent of the gyroscope, but it is obvious that the rotor of the electric motor 21 may be used as a gyroscope. Likewise, it would be possible to use any means of activating the gyroscope other than an electric motor.

In a general direction opposite to that of the arms 17, 17a and 17b, with respect to the axis C—$C_1$, the gyroscopic framework 16 includes two arms 23, 23a located in the plane of the axes B—$B_1$ and C—$C_1$. The conduit segment 24 is mounted, by joints 25, 25a, mechanically independent of the two end segments 26, 26a, and fixed respectively at the sides 13, 13a of the oscillating framework 10. It is further connected to the inlet and outlet channels of the fluid 27, 27a by flexible tubes 28, 28a. One measures only the Coriolis force exerted on the median segment 24 and no longer on the whole of the straight segment as in the example in FIGURE 1, the end segments 26, 26a being mechanically independent of the latter.

The only movement which the median segment 24 is permitted to effect, provided it remains at low amplitude, is essentially a movement of translation relative to the end segments 26, 26a, in the direction of the Coriolis force, i.e., parallel to the axis A—$A_1$.

The oscillating movement of the oscillating framework 10 is produced by an electro-magnet 29 mounted on the fixed support 7 and supplied with alternating current. This electro-magnet attracts an armature 30 fixed on the oscillating framework 10 in front of the electro-magnet 29. The force exerted by the electro-magnet 29 on the oscillating framework 21 is partially damped by a spring 31 connecting the oscillating framework to the fixed support 7.

According to another embodiment (FIGURE 3) the gyroscopic framework 16, bears, by means of a support bar 34, a magnetized bar 32, whose magnetic axis coincides with an electric winding 33 in the plane of the axes A—$A_1$ and B—$B_1$. If the electric winding 33 is excited with an alternating current, the magnetized bar 32 is subjected to an alternating couple and, as a result, so is the oscillating framework 10 which is rigidly locked to the gyroscopic framework, in its movement around the axis B—$B_1$.

The mass flowmeter according to the invention comprises also means of detection and a means of control whereby it is possible to change the speed of the motor as a function of the couple around the axis C—$C_1$.

The means for detecting the couple around the gyroscopic axis C—$C_1$ may be arranged as shown in FIGURE 3, in which the magnetized bar 32, already used to induce the oscillation of the framework 10, has a further function. In this case, an electric winding 35, located in the plane of the axes A—$A_1$ and C—$C_1$, is mounted on the fixed framework 7 in such a manner that there is produced in winding 35, as the magnet moves around the axis C—$C_1$, an alternating signal which does not depend directly on the one applied to the winding 33.

According to another embodiment such as shown in FIGURE 2, the gyroscopic framework 16 has a finger-bar 36 at a point remote from the axis C—$C_1$, and the oscillating framework has a finger 37 located opposite finger 36.

Between fingers 36 and 37, is provided a measuring means 38. Measuring means 38 consists, for example, of quartz or a pressure gauge which is sensitive to variations in the respective positions of conduit segment 24 and of the oscillating framework 10.

The current supplied by the measuring means 38 is applied to a control means 39 to regulate the speed of rotation of the gyroscope so as to reduce the couple exerted on the axis C—$C_1$. This means of control may consist of an electronic circuit.

Other detection means may be used for regulating the mass flowmeter. In particular a device such as is shown in FIGURE 4 may be used, i.e., a plane mirror 40, parallel to axes B—$B_1$ and C—$C_1$, which forms part of the gyroscopic framework 16. A light beam 42 supplied by a fixed collimator 41 falls substantially parallel to the axis A—A₁ onto the mirror which reflects the light beam onto a plane screen 43, parallel to axes B—B₁ and C—C₁, where the light spot is formed. The rotation of the gyroscopic framework 16 around the axis B—B₁ results in a displacement of the light spot relative to the axis C—C₁ and the rotation around the axis C—C₁ causes a displacement of the light spot parallel to the axis B—B₁. These displacements are substantially proportional in both cases to the rotation of the gyroscopic framework around the axes B—B₁ and C—C₁.

In another form of construction of the detection means (FIGURE 5) a plane mirror 44 is attached to the gyroscopic framework in a plane parallel to the axes A—A₁ and B—B₁. The fixed collimator 45 sends onto this mirror 44 a light beam 46 which is substantially parallel to axis B—B₁. The mirror reflects the beam onto a plane screen 47 parallel to axes A—A₁ and C—C₁. Oscillation of the gyroscopic framework 16 around the axis B—B₁ does not displace the light spot. Oscillation of the same framework 16 around the axis C—C₁ results in a displacement of the light spot parallel to the axis A—A₁.

By combining the two preceding embodiments (FIGURE 6) and by using a light beam 50 derived from a collimator 49, and cast upon the mirror 48 placed in a position intermediate of the two positions described above, one may cause the relationship to vary between the displacement of the spot on the screen 51 and the corresponding displacement of the gyroscopic framework 16. The displacement of the gyroscopic framework 16 around the axis C—C₁ is normally much less than its displacement around the axis B—B₁. One may therefore increase the first of these two movements with respect to the second, in order to make maximum use of the oscillogram traced by the spot upon the screen.

Lastly, in order to integrate the mass flow of fluid in relation to time, we use a revolution-counter 65 (FIGURE 2) which is connected by transmission means to the axis 19 of the gyroscope 20.

It may be observed that the mass flowmeter constructed is quite symmetrical with respect to the plane passing through the axes A—A₁ and B—B₁. It therefore adds the fluid flowing in one direction and subtracts the fluid flowing in the opposite direction.

It is often useful to know the total quantity of fluid flowing in one direction independently of the quantity flowing in the opposite direction. Two revolution-counters may therefore be mounted on the gyroscope—one being activated by means of a free wheel in a given direction of the gyroscope only, and the other by means of another free wheel being driven in the opposite direction of the gyroscope rotation only.

The revolution-counter may be connected to the gyroscope by a flexible shaft. It thus becomes possible to protect it from the vibrations of the oscillating framework 10 and to fasten it to the fixed support 7. One may likewise activate the revolution-counter with a synchronous motor supplied by the same electric circuit as the motor of the gyroscope 21, if the latter is itself of the synchronous type. This makes it possible to place the revolution-counter in a remote place and to thus provide for remote metering. One may also substitute for the revolution-counter an electrical means of counting the number of periods, in order to flash it on a screen by electronic means, or to code it and include it in means of calculation, teletransmission or automatic printing.

When one wants to measure large mass supplies with such a gyroscopic meter, it may be well to effect certain changes in the device described previously and shown in FIGURE 2.

Figure 7:
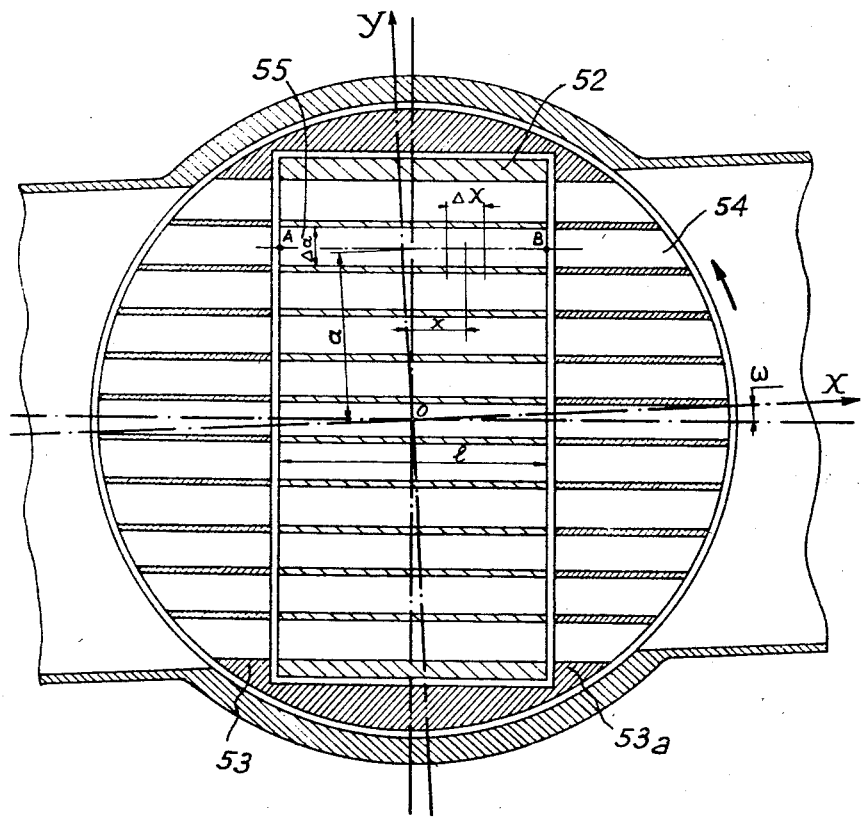
FIGURE 7 is a sectional view of a conduit segment for measuring which is divided into channels.

In this case, one changes the end conduit segments 53, 53a and the median segment 52, as shown in FIGURE 7.

The end segments 53, 53a are designed to give to the fluid entering the apparatus a very precise direction. In order that this direction be really constant, it is necessary that the diameter of the conduit be small in comparison to its length.

However, it is possible to juxtapose many conduits 54 in order to form a guiding grid. No special precaution as to equal distribution of the supply in this grid is necessary thanks to a balancing of pressure losses, provided that the flow be monophasic as will be demonstrated later on.

It is presumed that the median segment 52 which is wide but of limited length has been divided into a group of parallel channels 55, of small width $\Delta a$ in relation to their length $l$.

Axis C–C₁ is made axis of abcissas (FIGURE 7) an axis A–A₁, the axis of ordinates (FIGURES 1 and 2).

Consider a unitary channel 55 located at a distance $a$ from origin. At the instant $t$, this channel is inclined at an angle $\omega$ relative to the axis of abcissas. The equation of the axis of this channel is as an initial approximation:

$$Y = a + \omega X$$

It is presumed that a fluid passes through channel 55 at the constant speed V. An initial spurt of fluid of a length $\Delta X$, located at the time $t_0$ in the plane $X=O$, will be at the time $t$ in plane $X = V(t-t_0)$.

Indeed, V is inclined in the axis of abcissas only at a slight angle $\omega$, for which we may assume the cosine to be approximately 1.

The coordinates of the center of the spurt are:

$$X = V(t-t_0)$$
$$Y = a + \omega V(t-t_0)$$

One may calculate the acceleration $\vec{\gamma}$ to which the initial spurt of fluid is subjected, by virtue of the rotation:

$$\vec{\gamma} \begin{cases} \dfrac{d^2 X}{dt^2} = 0 \\ \dfrac{d^2 Y}{dt^2} = \dfrac{d^2 \omega}{dt^2} V(t-t_0) + \dfrac{2 d\omega}{dt} V \end{cases}$$

By taking into account that, at the time $t$, $X = V(t-t_0)$ it may be seen that:

$$\vec{\gamma} \begin{cases} \dfrac{d^2 X}{dt^2} = 0 \\ \dfrac{d^2 Y}{dt^2} = \dfrac{d^2 \omega}{dt^2} X + 2\dfrac{d\omega}{dt} V \end{cases}$$

The acceleration in the sense of Y to which the spurt of fluid is subjected is not the same from one end of the channel to the other. The width $\Delta a$ of the channel must be small as compared to its length in order to avoid a closed-circuit circulation in the channel.

Accelerations along the axis of the abcissas being nil, no circulation will arise from one channel to another and there is no objection to several channels being arranged in parallel.

We calculate the general resultant of the forces of pressure on the walls of the elementary channel 55 as follows: the ends A and B of the elementary channel have the following coordinates:

$$A \begin{cases} -a\omega - \dfrac{l}{2} = X \\ a - \omega\dfrac{l}{2} = Y \end{cases} \quad B \begin{cases} X = a\omega + \dfrac{l}{2} \\ Y = a + \omega\dfrac{l}{2} \end{cases}$$

$m$ being the specific mass of the fluid and $s$ the section of the channel, the general resultant of the pressure forces on the walls of the channel F, directed according to the axis OY, are:

$$F = \int_{-a\omega - \frac{l}{1}}^{-a\omega + \frac{l}{1}} ms\left[\frac{d^2\omega}{dt^2}X + 2\frac{d\omega}{dt}V\right]dX$$

$$F = lms\left[-a\frac{d^2\omega}{dt^2} + 2V\frac{d\omega}{dt}\right] \quad (1)$$

One may sum the general resultants of the hydrodynamic stresses on the elementary channels. If the distribution of the elementary channels is prefectly symmertical, only the terms in $$V\frac{d\omega}{dt}$$

remain and:

$$\Sigma F = 2V\frac{d\omega}{dt}ml^1\Sigma s = 2V\frac{d\omega}{dt}mls = \Sigma F \quad (2)$$

Since the result does not disclose the distance $a$ of the elementary channels from the plane of symmetry, the total section of passage S may be arbitrarily chosen.

If we apply the Equation 2 to a mass-flowmeter having a measuring chamber of ½ liter, through which passes natural gas of 10 bars (specific mass 7.3 g./l.) at a speed of 40 m./s.; if the oscillation of excitation has a frequency of 20 hertz; if the angle of oscillation is at ±2°; and if the vibration detector is sensitive at +25 mg., then accuracy of the measurement would vary only about 1/10,000 (1/100 of the 1/100 of the mass outflow).

In the moderately precise apparatus there is no need to filter the indications of the main vibration detector. In the case of the apparatus described above, is is sufficient that the symmetry be observed with an accuracy of about +0.1 mm. in order that the term arising from the unbalance of the fluid be negligible.

FIGURE 7 shows that the juxtaposition of elementary measuring channels 55 makes it possible to measure large mass flows without increasing the overall dimensions of the apparatus and without the mechanical parts (that should be perfectly rigid) becoming too loose. Such parts may be, for example, constructed by casting or by mechanical welding.

The sensitive element, especially if it is of great dimensions, will not be perfectly symmetric with regard to the plane containing the axis B—B₁ and C—C₁ (FIG. 1). If the mass flow is not monophasic, the specific mass of the fluid may vary from one elementary channel to the other.

By referring to the Equation 1 it is seen that the sum of the terms in $$\frac{d^2\omega}{dt^2} \cdot \omega$$

is then not nil.

It is recalled that the angle $\omega$ varies in a sinusoidal manner with time:

$$\omega = \omega_0 \cos \alpha t$$

therefore $$\frac{d^2\omega}{dt^2} \cdot \omega = -\omega_0^2\alpha^2 \cos^2 \alpha t = -\frac{\omega_0^2\alpha_2}{2}(1 + \cos^2 \alpha t)$$

and $$\frac{d\omega}{dt} = \omega_0\alpha \sin \alpha t = \omega_0\alpha \cos\left(\alpha t - \frac{\pi}{2}\right)$$

The effective term in $d\omega/dt$ therefore has neither the $$\frac{d\omega}{dt}$$

same period nor the same phase as the term to be cancelled in $$\frac{d^2\omega}{dt^2} \cdot \omega$$

It is advantageous to filter the indications furnished by the couple detector between (1) the framework common to the gyroscope and to the straight median segment, and (2) the mobile framework.

Since the alternating movement of oscillation of the mobile framework may not be of a strictly constant frequency (which has no bearing whatsoever on the measurement), it is preferable to command the aforementioned filter in response to the detected oscillations of the mobile framework, around the axis B—B₁ with respect to the fixed support.

In the embodiment shown in FIGURE 8, the mass flow meter is applied particularly to large fluid flows and it comprises an oscillating framework 56 having rotation shafts of which only the upper shaft 57 is shown in the drawing. These shafts are coincidental with axis B—B₁ which in this example is vertical. On this oscillating framework 56 is movably mounted along the axis C—C₁, the gyroscopic framework 58 containing the median element 52 whose section is divided so as to constitute several elementary channels 55, as shown in FIGURE 7.

The mobile framework 56 equally supports the two conduit end-segments 53, 54 which are in the form of a grid and are connected by light sealing means to the fluid inlet and outlet channels 59, 60.

A measuring gyroscope 61, whose action is comparable to the gyroscopic framework 20 in FIGURE 2, is mounted on the gyroscope 58 with its rotation axis A—A₁ perpendicular to the rotation axis B—B₁ of the oscillating framework 56.

A means for measuring displacement 64 is mounted on the gyroscopic framework 58 at a point remote from the axis C—C₁. This means 64 for measuring displacement may consist for example of a telephone receiver whose diaphragm, parallel to the axes B—B₁ and C—C₁ is provided with a small inertia block. This block which tends due to inertia to remain in the same position with regard to fixed shafts, begins to vibrate with respect to the gyroscopic framework 58 when the latter begins to vibrate with respect to the fixed axes. As in the preceding example of construction in FIGURE 2, the data furnished by this means 64 are applied to a means for controlling the rotation speed of the measuring gyroscope 61.

Until now it has been assumed that the fixed support (see FIGURE 2) was perfectly rigid and that its mass was infinite. Calculation shows that in a mass flow meter capable of measuring large mass flows (diameter of junction pipes of approximately 500 mm. for liquid hydrocarbons) the support should weigh several hundred tons, which is obviously impracticable.

The oscillating framework 56 and the framework common to the gyroscope 61 and to the channelling segment 58, acting as sensitive element, oscillate around the axis B—B₁. One may compensate exactly for the inertia of these parts together with the inertia of the fluid contained by driving them with an inertia motor 62 (FIGURE 8).

The oscillating body 56 may turn almost freely with respect to the fixed support around the axis B—B₁, (shown vertical in FIGURE 8, whereas it was horizontal in FIGURE 2). Only a weak spring 65 brings it back to its position of equilibrium.

The lower portion of oscillating body 56 carries the stator of motor 62 whose shaft is parallel to the axis B—B₁.

The rotor of this motor 62 is connected to the stator on the one hand by bearings compelling it to turn parallel to the axis B—B₁ and on, on the other hand, with a spring 66 (for example, spiral) for tuning approximately the natural period of the device to the period required for the oscillation of the oscillating body 56.

The assembly comprising the inertia motor 62 and spring 66 is mounted in a sealed case without a shaft passage, which protects it from the chemical action of the fluid to be measured.

The measuring gyroscope 61 does not counter balance the Coriolis force since it supplies a couple, but transfers the Coriolis force to the axis C—C₁ and, through its instrumentality to the oscillating framework 56. The latter transmits the Coriolis force to the "fixed" support.

In order to avoid mechanical reactions harmful to the performance of the "fixed" support, the Coriolis force is almost exactly counterbalanced by means of a gyroscope 63 fixed to the oscillating framework 56 and constructed exactly like the measuring gyroscope 61. However it rotates in the direction opposite to the rotation of the gyroscope 61 at exactly the same speed as that gyroscope. This condition is obtained, for example, if these two gyroscopes are driven by synchronous motors.

This assertion may be demonstrated by theoretically isolating from the exterior world the mass-flow meter and a short section of the inlet and outlet conduits. The fluid passes through this assembly without rotation if the oscillating framework 56 and the framework common to the sensitive element 52 and to the measuring gyroscope 61 have no movement in relation to each other (the conditions of operation of the mass-flow meter being achieved). Therefore, there is no reason for the mass-flow meter to tend to turn around the axis of the conduit. Since the external casing of the mass-flow meter forms a hollow revolving body, the fluid cannot exert any couple on the casing. There is therefore no force exerted by the oscillating framework on the external casing through the intermediary of the shafts coaxial to axis B—B₁ which, theoretically, could be eliminated.

Of course, the present invention is not limited to the embodiments described and shown, but it covers, on the contrary, all the variations.

Having thus described my invention what I claim is:

1. A device for measuring mass flow of a liquid including a framework movably mounted to rotate about an axis of a fixed support, power means associated with said framework for imparting oscillatory action thereto, a conduit element comprised of two end segments and a mechanically independent center segment adapted to form a passageway for the liquid to be measured, said two end segments being fixed to said framework and said center segment forming part of a gyroscopic framework movably mounted on said framework to oscillate about an axis parallel to the axis of the conduit element, said gyroscopic framework also supporting a gyroscope separated from said center segment and mounted with its axis of rotation perpendicular to the axis of oscillation of said gyroscopic framework, means for measuring the couple force applied from said gyroscopic framework to said framework, means for controlling the rotational speed of said gyroscope in response to said measuring means in order to substantially reduce this couple force, and means for measuring rotor speed of said gyroscope as an indication of the mass flow of liquid over a predetermined time.

2. A device according to claim 1 wherein said center segment is comprised of a plurality of measuring channels in juxtaposition, said end segments being each made up of a corresponding number of narrow conduits, said power means is comprised of an inertia motor whose shaft is fixed to said framework by bearings and a damping means whereby the rotational axis of the motor defines the axis of oscillation of said framework and said damping means defines the period of oscillation, and said gyroscopic framework supports a compensating gyroscope identical to and mounted symmetrically with respect to said gyroscope and rotatable at the same speed and in the opposite direction of the latter.

3. A device as set forth in claim 1 wherein said power means is comprised of an armature mounted upon said framework in alignment with an electro-magnet on said fixed support which is adapted to be energized by alternating current; and said measuring means includes a pressure sensing device attached to said framework to detect the relative movement of a finger bar attached to said gyroscopic framework.

4. A device as set forth in claim 1 wherein said power means includes a magnetic bar attached to said framework and adapted to cooperate with a first winding around said fixed support which is adapted to be energized by alternating current; and said measuring means is comprised of a second winding around said fixed support in which there is induced an electrical signal in response to movement of said magnetic bar.

5. A device as set forth in claim 1 wherein said measuring means includes a mirror atached to said gyroscopic frame in a position whereby it will reflect light from a fixed collimator onto a screen attached to said fixed support.

References Cited
UNITED STATES PATENTS

| | | | |
|---|---|---|---|
| 3,132,512 | 5/1964 | Roth | 73—194 |
| 3,329,019 | 4/1967 | Sipin | 73—194 |

FOREIGN PATENTS

| | | |
|---|---|---|
| 117,091 | 5/1959 | U.S.S.R. |

RICHARD C. QUEISSER, *Primary Examiner.*

E. D. GILHOOLY, *Assistant Examiner.*